Sept. 1, 1936.  J. M. LEDNUM ET AL  2,052,931
AIR DEHYDRATION UNIT
Filed Oct. 19, 1934   4 Sheets-Sheet 1
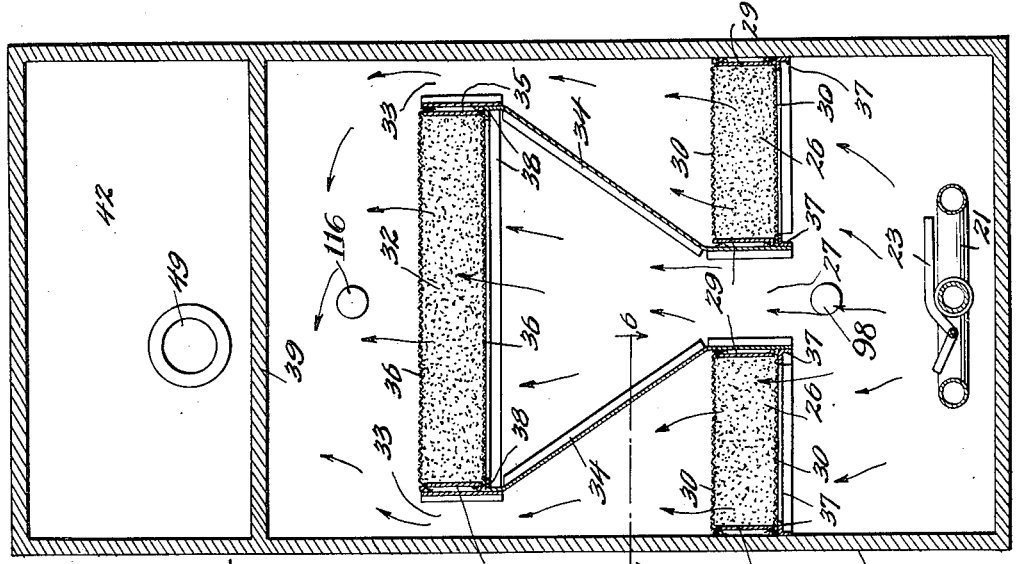
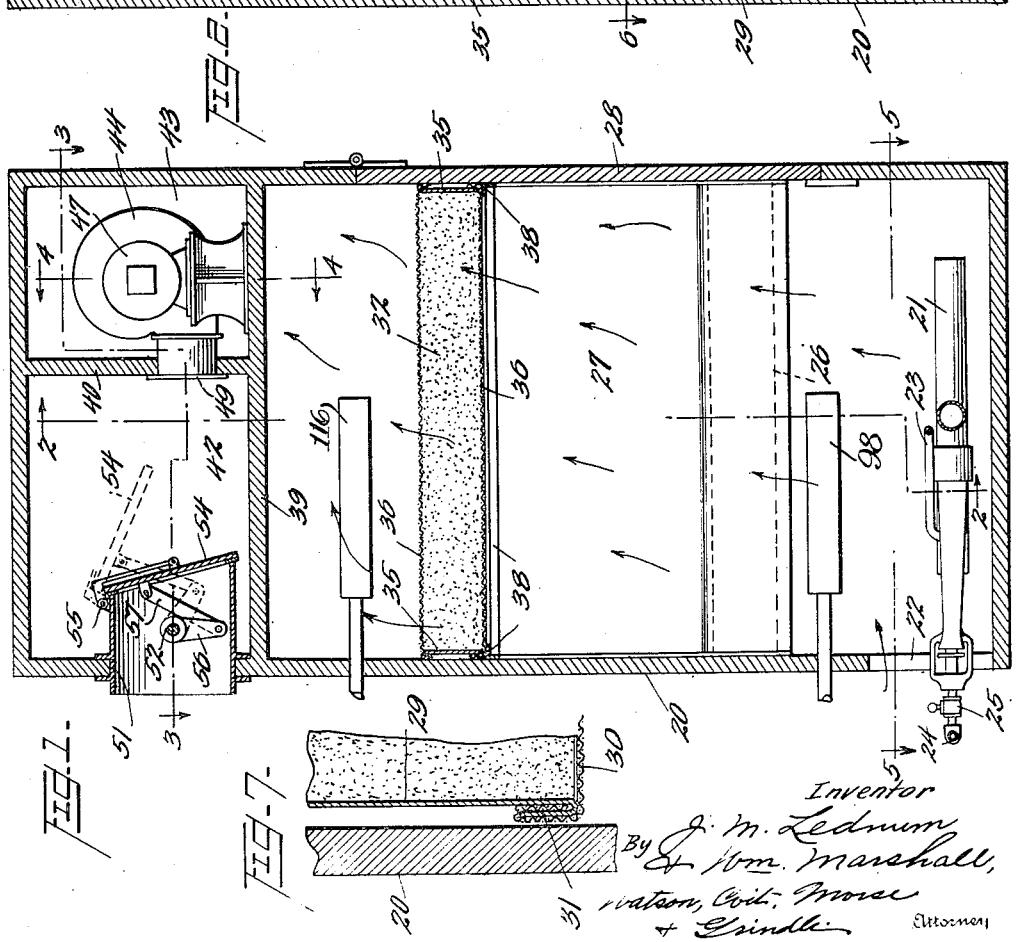

Sept. 1, 1936. J. M. LEDNUM ET AL 2,052,931
AIR DEHYDRATION UNIT
Filed Oct. 19, 1934 4 Sheets-Sheet 2
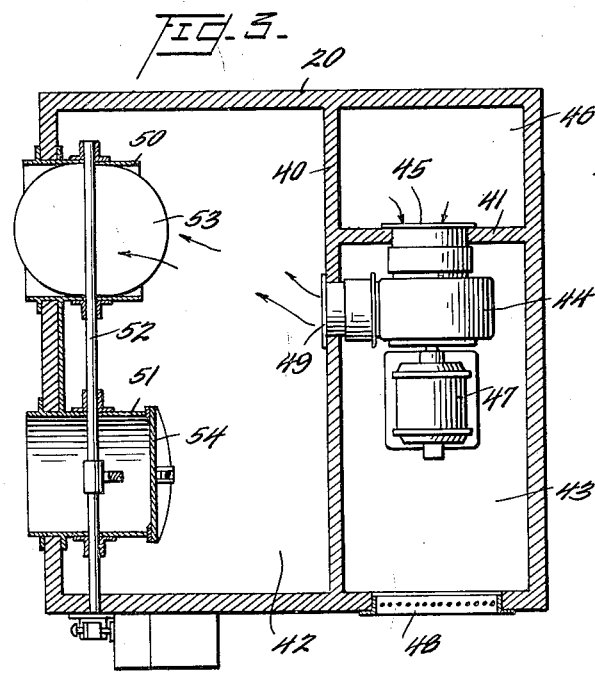
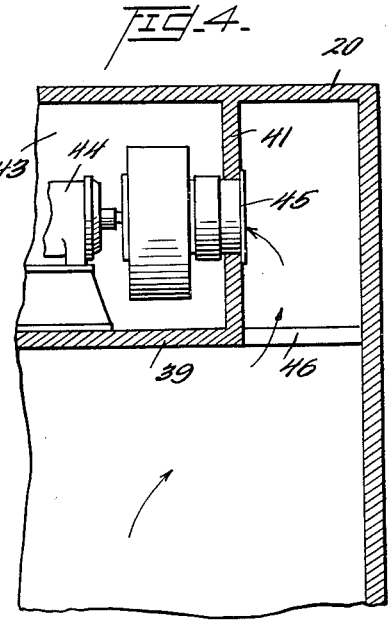
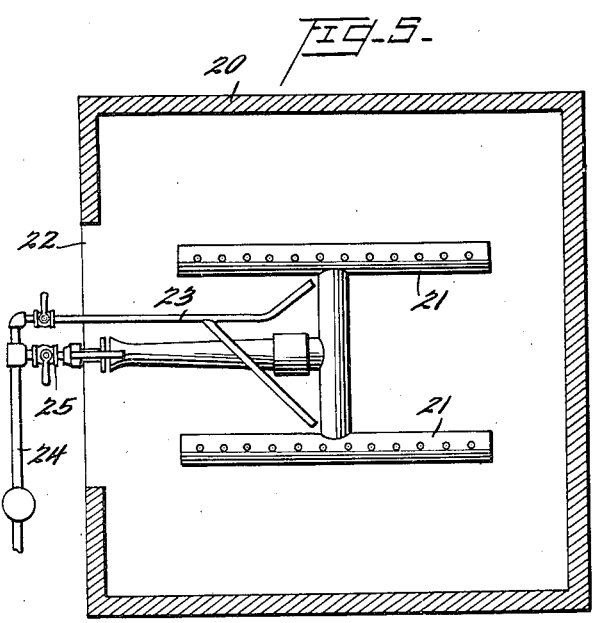
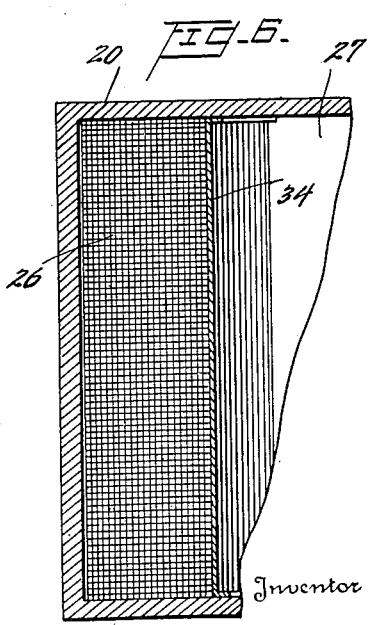

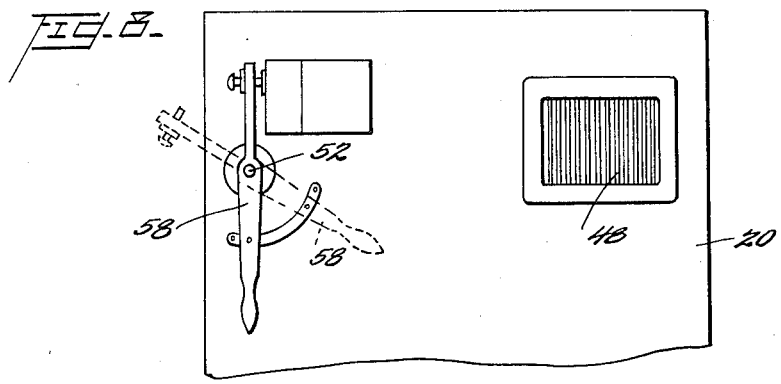
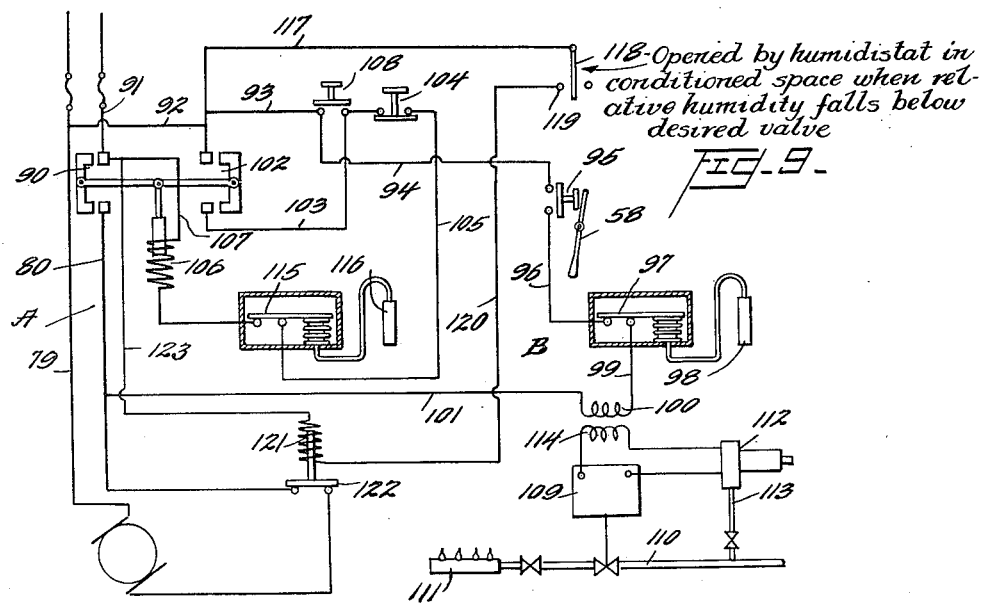
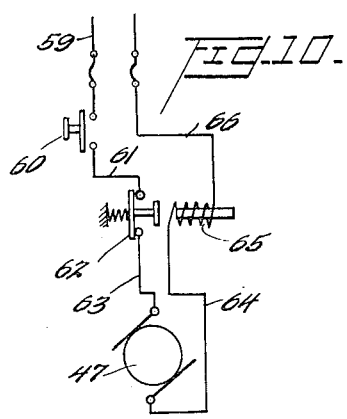
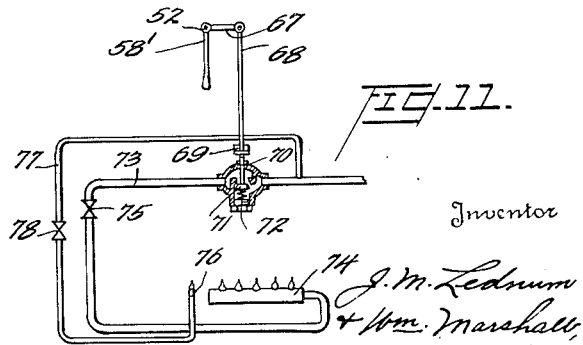

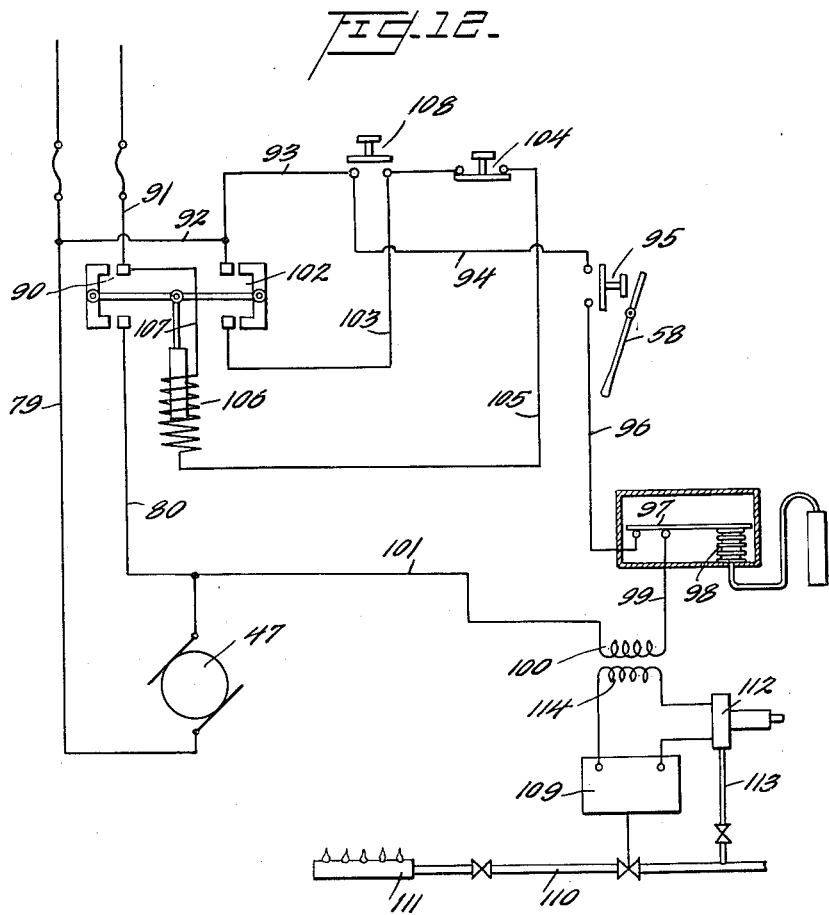

Patented Sept. 1, 1936

2,052,931

UNITED STATES PATENT OFFICE 2,052,931

AIR DEHYDRATION UNIT

James M. Lednum, Baltimore, and William Marshall, Catonsville, Md., assignors, by mesne assignments, to The Davison Chemical Corporation, Baltimore, Md., a corporation of Maryland Application October 19, 1934, Serial No. 749,100

4 Claims. (Cl. 183—4)

The present invention relates to an air dehydration unit of simple construction and dependable operation.

The unit is of the type employing a solid porous moisture adsorbent material, the beds thereof being disposed to give a relatively large area and low resistance to the passage of air therethrough.

Other features of the invention are:

1. The beds of adsorbent are removable as units so that when desired, fresh beds of adsorbent can be substituted for spent beds.

2. The unit is provided with two gas discharge ports and a single means controlling the same to simultaneously open one and close the other.

3. The means that controls the ports also controls the starting and stopping of the means to heat the beds of adsorbent to activate the same.

4. The heating means is regulated in accordance with the temperature adjacent the beds of adsorbent.

5. The heating means is cut off when the temperature on the inlet side of the adsorbent bed exceeds a predetermined amount.

6. The operation of the fan that effects the flow of air is regulated by the temperature adjacent the bed of adsorbent and/or by the temperature on the exit side of the bed of adsorbent.

7. The operation of the fan may also be controlled by a humidistat disposed in the space to be conditioned.

Other objects and features of novelty of the invention will be apparent from the description taken in connection with the drawings in which:

Figure 1 is a vertical sectional elevation taken through one embodiment of the invention;

Figure 2 is a vertical sectional elevation taken substantially on the line 2—2 of Figure 1;

Figure 3 is a horizontal sectional view taken substantially on the line 3—3 of Figure 1;

Figure 4 is a partial sectional elevation taken substantially on the line 4—4 of Figure 1;

Figure 5 is a sectional plan view taken substantially on the line 5—5 of Figure 1 and showing the burner;

Figure 6 is a partial horizontal sectional view taken substantially on the line 6—6 of Figure 2;

Figure 7 is an enlarged sectional view of a detail showing one method of attaching the screens to the casing holding the adsorbent;

Figure 8 is a partial side elevation of the top portion of the unit;

Figure 9 is a diagrammatic view illustrating the various electric circuits for controlling the operation of the unit;

Figure 10 is a diagrammatic view showing one arrangement of the electric circuit for supplying energy to the fan;

Figure 11 is a diagrammatic view illustrating a mechanical means for controlling the fuel supply valve, and Figure 12 is a diagrammatic view illustrating electrical means controlling the fuel supply valve.

Briefly stated, the unit comprises an insulated casing having a heating device and an air inlet at one end thereof and a mass of solid dehydrating material such as silica gel interposed between the heating device and the other end of the unit. At this other end there is provided a fan for the purpose of drawing air through the bed of dehydrating material and discharging it to be conveyed to the point of use. During a certain period of operation of the unit, air is taken in through said inlet and passed through the bed of dehydrating material whereby moisture is extracted from the same and the dried air is discharged through the outlet by means of the fan. During another period of operation, the heating device is turned on so that the air admitted through the inlet is heated and passing through the bed of dehydrating material activates the same. This heated air is taken by the fan and discharged through another outlet, the outlet for the dehydrated air being closed during this period of operation.

In the embodiment of the invention illustrated, the device comprises the insulated casing 20 which, as shown, is rectangular in horizontal and vertical cross sections, although the device might take other forms.

In the form illustrated the heating device is located at the lower end of the casing and the outlets at the upper end, but it is to be understood that this arrangement might be reversed. The heating device is shown as a gas burner 21 projecting through the air inlet 22 and having a pilot 23 supplied through gas pipe 24, the main burner being furnished with gas from the same pipe through the valve 25. Although gas is mentioned as the fuel it is to be understood that other fuels and heating means might be employed.

Disposed above the gas burner is the mass of dehydrating material, preferably silica gel. As shown, the adsorbent dehydrating material is arranged in a particular manner. Two beds 26 of the material are disposed at one level in such manner as to form a central passageway 27 therebetween. The beds may be constructed in any preferred manner such that they may be removed laterally through the removable panel or doorway 28 in one side of the casing. As shown, each of the beds 26 comprises the side members 29 and top and bottom screen members 30. These screen members may be secured to the side members in any suitable manner. As shown at 31, Figure 7, the margins of the screens and a portion of the side members are bent back on themselves in such a manner as to clamp the margin of the screen against the outside of the side members 29. Disposed above the beds 26 is a third bed 32 of adsorbent material arranged in such a manner that two of its sides are spaced from the adjacent sides of the casing in such a manner as to form the passageways 33.

In operation, air passes directly through the beds 26 and thence upwardly and through the passages 33 at the sides of the bed 32. Air for the bed 32 is supplied through the passageway 27, a suitable trough-shaped casing 34 being provided for this purpose. This casing acts to keep the dehydrated air that is passed through the beds 26 separate from the non-dehydrated air supplied through the passageway 27.

It will be understood that the bed 32 consists of the side members 35 and top and bottom screen members 36 secured to the side members in the same manner as described in connection with the beds 26.

The beds 26 are supported on angle irons 37 in such manner that they may be withdrawn laterally through the doorway 28. Similarly, the bed 32 is supported on angle irons 38 which also permit the bed to be withdrawn through the doorway 28.

The beds might be staggered in other ways so that the untreated air will have access to one side of each bed and the treated air after it has passed through the beds will be kept from mixing with the untreated air.

At its upper end the casing is provided with a horizontal partition 39 and the vertical partitions 40 and 41. These partitions divide this end of the casing into two chambers 42 and 43. In the chamber 43 there is disposed a fan 44 having an inlet 45 through the partition 41, the same being supplied with air that is passed through the beds of adsorbent material through a port 46 formed in the partition 39. The fan 44 may be operated by a motor 47 and the chamber 43 may be provided with a ventilating opening 48. The fan discharges through outlet 49 into the chamber 42 which is provided with two outlets, one of which is closed when the other is open. As shown, these outlets are formed in one wall of the casing, and comprise the sleeves 50 and 51. Any suitable form of valves may be disposed in the sleeves to control the outlets. In one arrangement, a valve spindle 52 extends transversely through the two sleeves and projects through the side wall of the casing 20. In the sleeve 50 there is mounted on the spindle 52 a butterfly valve 53. The valve controlling the outlet through sleeve 51 consists of a plate or disc 54 pivoted at 55 for movement to and from the inner inclined edge of the sleeve. This movement is effected from the valve spindle 52 by means of the crank arm 56 secured thereto and the link 57 connecting the end of the crank arm and the valve disc 54. The valves are connected to the valve spindle 52 in such a manner that when valve 53 is closed, valve 54 is open and vice versa.

It is desirable that the valves be operated in such manner that when air is being dehydrated, valve 53 is tightly closed and valve 54 is open. On the other hand when the hot gases are passing through the beds of adsorbent material for the purpose of activating or regenerating the same, valve 54 is closed and valve 53 is open. For the purpose of actuating these valves from the outside of the casing, a lever 58 is secured to the projecting end of the valve spindle 52. When this lever is in the dotted line position shown in Figure 8, the unit is operating to dehydrate the air. When the lever is in the full line or vertical position shown in Figure 8, valve 54 is closed and valve 53 is open so that the unit is on the activation period of the complete cycle. If desired a suitable flue (not shown) may be connected to the outer end of sleeve 50 for conducting away the hot gases. The dehydrated air may be discharged directly from the sleeve 51 or if required a suitable flue may be provided to conduct the dehydrated air to the point of use thereof.

It is to be understood that the unit is preferably of such size that it is portable, that is to say, it may be easily moved from one place to another.

If desired the unit may be provided with either electrical or mechanical means for actuating the gas supply valve which controls the flow of gas to the burner and to the pilot.

Fig. 11 shows a mechanical means for controlling the gas supply valve adapted for use in connection with the wiring diagram for the motor shown in Fig. 10. Referring to the latter figure, the current is supplied through the conductor 59 when the switch 60 is closed and flows through conductor 61, overload switch 62, and conductor 63 to the motor 47. On the negative side the current flows through conductor 64, the coil 65 controlling the overload switch 62 and conductor 66. It will be noted that when switch 60 is closed, the fan will operate continuously unless the circuit is broken by the overload switch 62.

Referring to Fig. 11, the valve operating handle 58' on the end of spindle 52 is provided with an arm 67 from which depends a rod 68 adapted to pass through the guide 69 and engage the end of the valve stem 70. The disc 71 of this valve is forced in a closing direction by the spring 72. In operation when the valve operating handle 58' is in the position shown in Fig. 11, the butterfly valve 53 is open and the plate valve 54 closed. Movement of the handle to this position depresses the valve stem 70 by means of the rod 68 opening the gas valve disc 71 and permitting gas to be supplied through pipe 73 to the burner 74. A suitable gas stop cock 75 may be provided in this pipe. A pilot 76 is supplied through the pipe 77 connected to pipe 73 on the upstream side of the main gas valve. A stop cock 78 may be provided in this line if desired.

When the handle 58' is moved in a counter-clockwise direction as viewed in Fig. 11 to close the butterfly valve 53 and open the plate valve 54, the spring 72 closes the valve disc 71 and cuts off the supply of gas to the burner.

The wiring diagram for controlling the main gas valve electrically is shown in Fig. 12. Referring to this figure the fan motor 47 is supplied with current through the conductor 79, the return being through conductor 80, contactor 90 and conductor 91. The circuit for controlling the gas valve includes conductors 92, 93 and 94, push button switch 95 under the control of operating lever 58, conductor 96, switch 97 controlled by a thermostat 98 located on the inlet side of the lower beds of adsorbent, conductor 99, primary 100 of the transformer, and conductor 101 leading to one of the terminals of the contactor 90.

There is also provided a second contactor 102 and when this is closed current flows through the same, conductor 103, normally closed switch 104, conductor 105, contactor actuating coil 106 and conductor 107 connected to the upper terminal of contactor 90.

In order to cause both of the contactors to close their respective circuits, there is provided a push button station of the momentary contact type 108.

In order to start the operation of the fan, the push button 108 is actuated, which supplies current to conductor 105 and energizes coil 106, causing contactors 90 and 102 to close. The fan will remain in operation as long as switch 104 remains closed, that is to say, the fan will operate continuously during the periods of activation and dehydration. When the unit is on the dehydration portion of its cycle, the switch 95 is open, but when it is desired to activate or regenerate the adsorptive material, the lever 58 is turned to the full-line position shown in Fig. 8 which actuates the valves so as to open the valve for discharging hot gases and close the valve for discharging the dehydrated air, and this movement of the lever closes the switch 95, thereby permitting current to flow to the primary 100 of the transformer which causes the gas valve to be opened. For this purpose there is provided an electric gas valve 109 of well known construction controlling the flow of gas in the pipe 110 leading to the burner 111. In addition, there is provided an electric safety pilot 112 of well known construction, supplied from the main pipe 110 through pipe 113. When the current flows in the primary 100 the secondary 114 is energized, and if the pilot is lighted, the electric gas valve 109 will be opened. If, for any reason, the pilot goes out, then the circuit including the secondary 114 is broken and the gas valve is closed. On the other hand if the temperature on the inlet side of the lower beds of adsorbent rises above a predetermined value, then switch 97 is opened and current ceases to flow in the primary 100 which in turn causes the electric gas valve to close, cutting off the supply of gas to the burner. On the other hand after the temperature on the inlet side of the beds of adsorbent has fallen below this predetermined value the switch 97 will close and the gas valve will be opened, thereby continuing or reestablishing the activation of the adsorbent. However, the fan continues to operate as long as switch 104 remains closed.

After the adsorbent has been sufficiently activated or regenerated, the lever 58 is turned in the direction to open the switch 95 and simultaneously reverse the valves 53 and 54 so that the unit then goes on the adsorption portion of its cycle.

In Fig. 9 the circuits just described in connection with Fig. 12 are designated A and B. Additional circuits are shown for controlling the operation of the unit, and it may be built with one or more of the circuits embodied therein.

To render the unit more dependable in operation, there may be provided in conductor 105, a switch 115 controlled by a thermostat 116 located on the outlet side of any one of the beds of adsorbent material. If the temperature at this point rises above a predetermined value, then this switch will open and cut off the flow of current so that both contactors 90 and 102 will be opened and the fan will cease to operate.

Further there may be provided a circuit for controlling the operation of the unit in accordance with the humidity in the space to which the dehydrated air is supplied. For this purpose the circuit comprises a conductor 117 leading from the upper terminal of contactor 102 to a pivoted arm 118 controlled by a humidistat located in the space to which the dehydrated air is supplied. If the humidity falls below a predetermined value then the arm 118 contacts with terminal 119 connected with conductor 120 which leads to a relay 121 controlling a switch 122 in the fan motor circuit. From the relay 121 current flows through conductor 123 to the upper terminal of contactor 90. The switch 122 is normally closed, but is opened when the coil 121 is energized. As this switch is in the motor circuit, it will start and stop the motor provided the contactor 90 is closed. If the unit is operating on the adsorption period and the humidity in the conditioned space drops below the setting of the humidistat, the arm 118 will contact with the terminal 119, energizing the relay coil 121 thereby opening switch 122 and stopping the motor, which action, of course, will cut the unit out of service and no dehumidification will be done. When the humidity in the conditioned space rises, the arm 118 will break contact with the terminal 119 and the relay coil 121 will be deenergized, and switch 122 will close, thus starting the fan and causing the unit to resume dehumidification.

It will be understood that two units may be combined in such manner that when one is on the dehydration portion of its cycle, the other is on the activation portion. Where two such units are employed, a single spindle 52 would be used for both units.

Although an embodiment of the invention has been described in detail, it is to be distinctly understood that the invention is not thus limited, but includes modifications and changes that come within the scope of the appended claims.

Having thus described the invention, what is claimed as new and desired to be secured by Letters Patent is:

1. An air dehydration unit including, in combination, a casing, partitions forming two chambers at one end of said casing, an air inlet at the other end, a bed of solid adsorbent material disposed between said inlet and chambers, one chamber having two ports in its walls, valves controlling said ports, means to simultaneously open one valve and close the other, a fan in the other chamber having its inlet connected to draw air through said bed of adsorbent material and its outlet to discharge into the chamber having the ports, and means to heat the air supplied through said casing inlet at intervals before it passes through said bed.

2. An air dehydration unit including, in combination, a casing, partitions forming two chambers at the top thereof, a fan in one chamber having its inlet in communication with the interior of said casing and discharging into the other chamber, two ports in the wall of the other chamber, valves controlling said ports, means to simultaneously open one valve and close the other, an air inlet near the bottom of said casing, heater means in the casing adjacent said inlet, a bed of solid porous adsorbent material in the casing disposed between said heater means and said chambers through which air from said inlet passes, and means to control said heater means.

3. An air dehydration unit including, in combination, a casing having an inlet, a chamber within the casing having two ports in its wall, a bed of solid porous adsorbent material in the casing, a fan to draw air through said inlet and bed and deliver it into said chamber, means to heat said air at intervals, a valve controlling each of said ports, an electric circuit controlling said heating means in accordance with the temperature adjacent said bed, and means to simultaneously open one valve, close the other and close said circuit.

4. The unit according to claim 3 adapted to supply dehydrated air to a space to be conditioned, and means controlled by the temperature on the exit side of the bed to regulate operation of the fan and humidistat controlled means to also regulate the operation of the fan the humidistat being located in the conditioned space.

JAMES M. LEDNUM.
WILLIAM MARSHALL.